United States Patent [19]

Urbaitis

[11] 4,054,299
[45] * Oct. 18, 1977

[54] STEP MEMBER FOR TRACTORS

[75] Inventor: Vincas Urbaitis, Mayfield Heights, Ohio

[73] Assignee: General Motors Corporation, Detroit, Mich.

[*] Notice: The portion of the term of this patent subsequent to Aug. 23, 1994, has been disclaimed.

[21] Appl. No.: 692,655

[22] Filed: June 4, 1976

[51] Int. Cl.² .............................................. B60R 3/02
[52] U.S. Cl. ...................................... 280/163; 182/90
[58] Field of Search ................. 280/163, 166; 182/86, 182/90

[56] References Cited

U.S. PATENT DOCUMENTS

| 2,651,789 | 9/1953 | Newland | 182/90 |
| 3,887,216 | 6/1975 | Perry | 280/163 |
| 3,967,695 | 7/1976 | Waddell | 280/166 |

Primary Examiner—Robert R. Song
Attorney, Agent, or Firm—Edward J. Biskup

[57] ABSTRACT

A step member for attachment to a frame of a tractor that includes a single flexible cable having the opposite ends thereof provided with bracket members which serve to attach the cable to the tractor frame so as to form the cable into a generally U-shaped configuration and provide a pair of vertically oriented arcuate legs and a substantially horizontal base the latter of which has a foot supporting plate secured thereto of a length substantially less than the distance between the coupling members.

3 Claims, 4 Drawing Figures

STEP MEMBER FOR TRACTORS

The invention concerns a step member which can be utilized with a tractor and more specifically a single cable type step member that is particularly adapted for use with an earthmoving tractor and is capable to be attached to the frame thereof and provide access for the operator to the operator's cab.

It is quite common to provide a step member on tractors so as to facilitate ingress and egress to operator's cab. One example of a step member of this type can be seen in my co-pending patent application Ser. No. 692,656, entitled "Step Member for Tractor," which is assigned to the assignee to this invention. In that case, the step member consists of two separate cable portions, two coupling members, two brackets, and a foot supporting plate all of which are connected in a manner to provide a flexible step which will pivot upwardly in a plane parallel to the longitudinal axis of the tractor whenever the step assembly encounters an obstacle so as to prevent damage to the step. As should be apparent, because of the large number of parts involved, this type of step assembly is relatively expensive to manufacture. Accordingly, the present invention contemplates a step member which consists of a single cable combined with a pair of bracket members and a simplified foot plate so as to provide a simple and inexpensive step assembly.

In this regard and in the preferred form, the step member according to the present invention consists of a continuous flexible cable with the opposite ends thereof provided with bracket members which serve to connect the ends of the cable to the lower exposed frame of a tractor. Each of the bracket members has a vertical leg and a horizontal leg with the vertical leg being pivotally connected to the frame while the horizontal leg is rigidly fixed with the end of the cable so as to laterally space the cable from the frame. The bracket members are connected to the frame at space points so as to form the cable into a generally bowed configuration which includes a pair of vertically oriented curved legs and a horizontal base. A foot supporting plate is secured to the horizontal base and is characterized by being of a length substantially less than the distance between the attached bracket members. In this manner, the legs of the cable maintain a bowed form in their normal state, and the step member does not experience any permanent deformation when a load such as the weight of the operator is placed on the foot supporting plate.

The objects of the present invention are to provide a new and improved step member which is formed from a continuous single cable the opposite ends of which are rigidly attached to bracket members for pivotally connecting the step member to the tractor frame; to provide a new and improved pivotally supported step member which has a bowed configuration when attached to the tractor and has a foot supporting plate connected with an integral part of the cable; to provide a new and improved step assembly for a tractor frame formed from a single continuous cable with the ends thereof attached to the frame through pivotal connections which are spaced from each other a distance which allows the cable to maintain a bowed form, and to provide a new and improved step member for a tractor that is inexpensive to manufacture and utilizes a single flexible cable for providing the legs and base portion of the step member with the ends of the legs being pivotally mountable to the tractor so as to permit the step member to pivot in a plane parallel to the longitudinal center axis of the tractor when it encounters an obstacle. Other objects and advantages of the present invention will be more apparent from the following detailed description when taken with the drawings in which:

Figure 1:
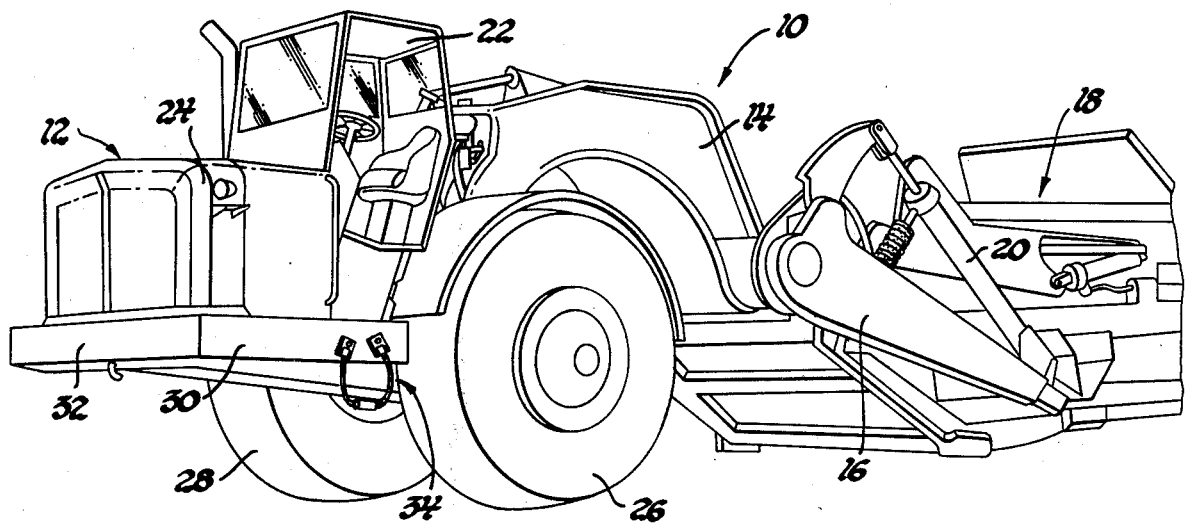
FIG. 1 shows an overhung off-high way scraper incorporating a step member made in accordance with the invention.
Figure 2:
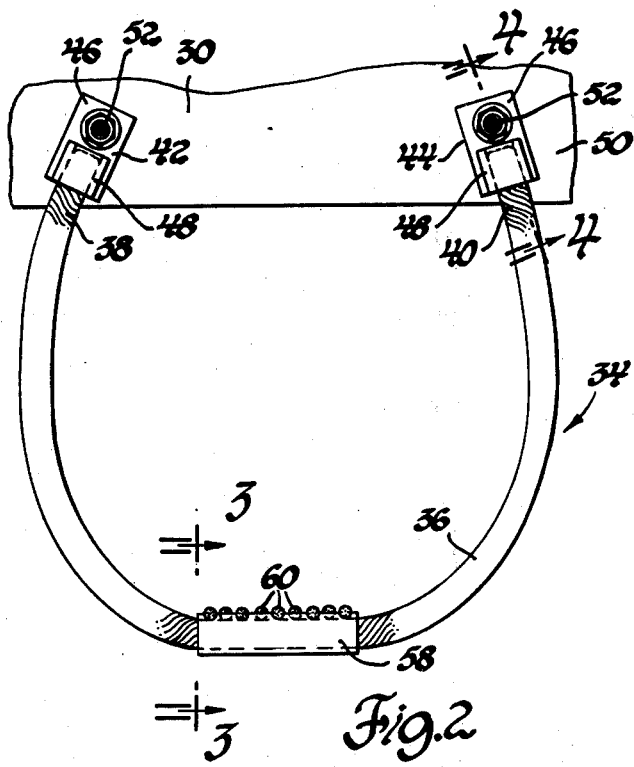
FIG. 2 is an elevation view of the step member shown in FIG. 1.
Figure 4:
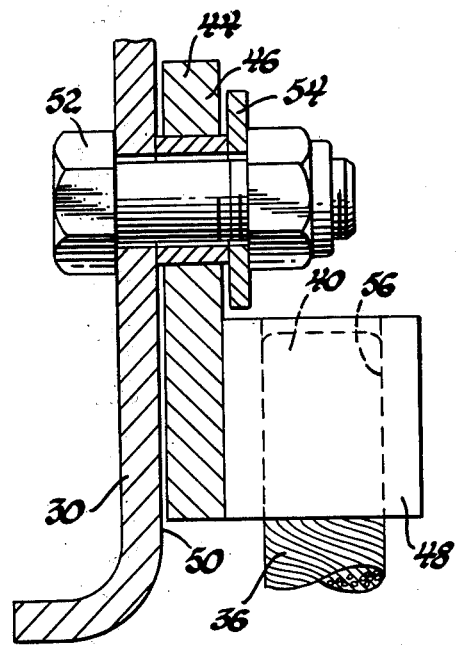
Figure 3:
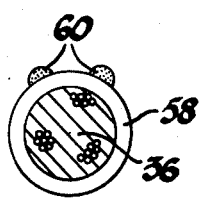

FIGS. 3 and 4 are enlarged sectional views taken on line 3—3 and 4—4 respectively of FIG. 2;

Referring to the drawings and more particularly FIGS. 1, 2 and 4 thereof, a scraper 10 is shown having the usual overhung tractor 12 attached by a gooseneck 14 to a pull arm assembly 16 which supports a scraper bowl 18 for movement between a dig-position and a carry-position as controlled by a lift cylinder 20 carried by each of the arms of the pull arm assembly 16. The tractor 12 includes an operator's station 22 located to the rear of an engine compartment 24 having an engine (not shown) which serves to power the laterally spaced wheels 26 and 28 of the tractor. A frame assembly supports the engine and the other components which make up the drive train and includes rigid side and front channel members respectively identified by the reference numerals 30 and 32.

As is well known, the operator's station of scrapers of the type described above is usually difficult to gain access to because of the size of the tractor. Accordingly, in order to facilitate ingress and egress, a step member 34 made in accordance with the invention is provided on the tractor 12 below the operator's station and is attached to the outer side portion of the longitudinally extending side channel member 30 which forms a part of the frame assembly.

As seen in FIG. 2, the step member 34 comprises a continuous flexible cable 36 the opposed ends 38 and 40 of which are rigidly fixed with identical L-shaped bracket members 42 and 44. Each of the bracket members includes a vertical leg 46 and a horizontal leg 48 which are rigidly interconnected. The vertical leg 46 is pivotally connected to the outer vertical surface 50 of the channel member 30 by a bolt assembly 52 which includes a bushing 54 while the horizontal leg 48 is generally cylindrical in shape and has an opening 56 formed therein which rigidly accommodates the associated end of the cable 36. The horizontal leg 48 spaces the cable 36 laterally outwardly from the surface 50 of the frame.

The step member 34, when in the normal position, has a generally U-shaped configuration with the legs thereof assuming an arcuate form and being vertically oriented while the base portion lies in a substantially horizontal plane. As to the latter, it will be noted that a foot supporting sleeve 58 is secured to the base portion and has a plurality of upstanding projections 60 formed thereon for providing a gripping surface for the shoe of the operator. It will also be noted that the length of the foot supporting sleeve 58 is substantially less than the distance between the attachment points of the bracket members 42 and 44 to the channel member 30. Thus, the possibility of the cable obtaining a permanent deformed section is substantially eliminated.

From the above, it should be apparent that during operation of the scraper if the tractor should encounter any large obstacles which could damage any part depending from the lower surface of the frame, the flexing characteristics of the cable 36 incorporated with the step member 34 will permit the latter to absorb bending movement without breakage or damage thereto.

A step member made according to the invention that has been found to perform satisfactorily had the cable formed from a ¾ inch 6 × 19 I.W.R.C. right long lay preformed steel cable purchased from Bethlehem Steel Co. The foot supporting sleeve was 5.0 inches in length and the distance between the centers of the bolt assemblies 52 as seen in FIG. 2 was 12.50 inches. The overall length of the cable was 40.50 inches with each end being inserted into and swaged to the horizontal leg 48 of the associated bracket member. The horizontal leg 48 spaced the center of the associated cable from the outer surface 50 of the frame a distance of approximately 1.00 inch.

Various changes and modifications can be made in this construction without departing from the spirit of the invention. Such changes and modifications are contemplated by the inventor and he does not wish to be limited except by the scope of the appended claims.

I claim:

1. In a tractor having an exposed lower frame portion susceptible to encountering obstacles and having a vertically oriented outer surface, a step member attached to and depending from said frame portion, said step member comprising a continuous flexible cable having opposed end portions, a bracket member for each end portion of said cable, each of said bracket members serving to connect the associated end portion of said cable to said outer surface of the frame portion so as to form said cable into a bowed configuration so that said step member has a pair of vertically oriented curved legs and a horizontal base, a pivotal connection for connecting one part of the bracket member to said outer surface with another part of said bracket member being rigidly fixed with the associated end portion of the cable so as to laterally space said cable from the outer surface, a foot supporting plate secured to said horizontal base, the arrangement being such that said foot supporting plate is free to pivot in a vertical plane about the pivotal connections when the tractor is moving in a fore or aft direction and the foot supporting plate encounters an obstacle.

2. In a tractor having an exposed lower frame portion susceptible to encountering obstacles and having a vertically oriented outer surface, a step member attached to and depending from said frame portion, said step member comprising a continuous flexible cable having opposed end portions, a bracket member secured to each end portion of said cable, each of said bracket members serving to connect the associated end portion of said cable to said outer surface of the frame portion so as to form said cable into a generally "U" shape so that said step member has a pair of vertically oriented curved legs and a horizontal base, each of said bracket members having a vertical leg and a horizontal leg, a pivotal connection for connecting the vertical leg to said outer surface with the horizontal leg being rigidly fixed with the associated end portion of the cable so as to laterally space said cable from the outer surface, a foot supporting plate secured to said horizontal base, the arrangement being such that said foot supporting plate is free to pivot in a vertical plane about the pivotal connections when the tractor is moving in a fore or aft direction and the foot supporting plate encounters and obstacle.

3. In a tractor having an exposed lower frame portion susceptible to encountering obstacles and having a vertically oriented outer surface, a step member attached to and depending from said frame portion, said step member comprising a continuous flexible cable having opposed end portions, and L-shaped bracket member secured to each end portion of said cable, each of said bracket members serving to connect the associated end portion of said cable to said outer surface of the frame portion so as to form said cable into a generally "U" shape so that said step member has a pair of vertically oriented curved legs and a horizontal base, each of said L-shaped bracket members having a vertical leg and a horizontal leg, a pivotal connection for connecting the vertical leg to said outer surface with the horizontal leg being rigidly fixed with the associated end portion of the cable so as to laterally space said cable from the outer surface, a foot supporting plate secured to said horizontal base, said foot supporting plate having a length substantially less than the distance between the pivotal connections when the step member is attached to said frame portion of the tractor, the arrangement being such that said foot supporting plate is free to pivot in a vertical plane about the pivotal connections when the tractor is moving in a fore or aft direction and the foot supporting plate encounters an obstacle.

* * * * *